Patented Dec. 4, 1928.

1,693,697

UNITED STATES PATENT OFFICE.

WILHELM HAFNER, OF SAARBRUCKEN, GERMANY.

COMPOSITION OF MATTER FOR USE IN HONING RAZORS AND OTHER KNIVES.

No Drawing. Application filed October 12, 1927, Serial No. 225,850, and in Germany October 14, 1926.

According to this invention a composition of matter for use in sharpening or honing razor blades and other knives, for example surgical knives, is produced by making a mixture containing glue, glycerine, emery powder and tripoli. To these constituents there may be added gelatine and sugar, or a substance, such as beet juice, containing a substantial proportion of sugar.

This composition is applied to a slab or strip of wood or the like, on which the honing is performed. A coating about ½ mm. in thickness is suitable. It may be convenient to coat both sides of the slab, making one side convex and the other flat, in the well known manner, and using for the convex side a composition coarser in grain than the composition used for the flat side.

The following is a specific example of suitable proportions for the mixture.

19 grams glue, 7 grams beet juice, 1 gram sugar, 0.5 gram gelatine and 25 drops of glycerine are mixed and boiled. For making the coarser composition 4 grams of emery powder and 5 grams of tripoli are added, the mixture being thoroughly stirred. For making the finer grade of composition, the proportions of emery and tripoli are reduced to 1 gram and 3 grams respectively.

The proportions of emery and tripoli used for the coarser grade may be substantially smaller than those indicated, if adequately coarse powder is used. I may add a distinctive coloring matter, say matter for darkening the coarser composition, so that it is plainly distinguishable from the finer composition.

The composition, when set, is highly uniform, and has the advantage that it is equally effective for honing in all directions of movement of the blade. There is no "grain" in respect of which the blade must be moved in a particular direction, as is the case with leather, and the composition does not bend under the pressure of the blade. No paste need be applied to its surface, before honing.

What I claim as my invention and desire to secure by Letters Patent of the United States is:—

1. A composition of matter for honing, consisting of a mixture containing glue, glycerine, and powdered emery and tripoli.

2. A composition of matter for honing, consisting of a mixture containing glue, glycerine, sugar and powdered emery and tripoli.

3. A composition of matter for honing, consisting of a mixture containing glue, glycerine, gelatine, sugar and powdered emery and tripoli.

4. A composition of matter for honing, consisting of a mixture containing substantially 19 gr. glue, 7 gr. beet juice, 1 gr. sugar, 0.5 gr. gelatine, 25 drops of glycerine between 1 gr. and 4 gr. emery powder, and between 3 gr. and 5 gr. tripoli powder.

In witness whereof I have signed this specification.

WILHELM HAFNER.